US012615462B1

(12) United States Patent
Ouyang et al.

(10) Patent No.: US 12,615,462 B1
(45) Date of Patent: Apr. 28, 2026

(54) AUDIO DEVICE

(71) Applicants: Shenzhen Huijing Technology Co., Ltd., Shenzhen (CN); Guangzhou Colorful Stage Equipment Co., Ltd, Guangzhou (CN)

(72) Inventors: Zuhui Ouyang, Shenzhen (CN); Haiquan Pang, Shenzhen (CN)

(73) Assignees: Shenzhen Huijing Technology Co., Ltd., Shenzhen (CN); Guangzhou Colorful Stage Equipment Co., Ltd., Guangzhou (CN)

( * ) Notice: Subject to any disclaimer, the term of this patent is extended or adjusted under 35 U.S.C. 154(b) by 79 days.

(21) Appl. No.: 19/185,278

(22) Filed: Apr. 22, 2025

(51) Int. Cl.
*H04R 1/02* (2006.01)

(52) U.S. Cl.
CPC .................................... *H04R 1/02* (2013.01)

(58) Field of Classification Search
CPC ....... H04B 1/3888; G06F 3/165; H04R 1/028; H04R 3/00; H04R 2205/021; H04R 2430/01
USPC .......................................................... 381/386
See application file for complete search history.

(56) References Cited

U.S. PATENT DOCUMENTS

2022/0014223 A1 * 1/2022 Hall-Henderson ..... G06F 3/165

* cited by examiner

*Primary Examiner* — Paul Kim

(57) ABSTRACT

An audio device includes a base defining a first accommodation cavity; a clamping member connected with the base for holding a smart terminal; a speaker unit arranged within the first accommodation cavity; a processing module electrically connected to the speaker unit; and at least one induction module electrically connected to the processing module, wherein the at least one induction module comprises a bobbin; silicon steel laminations inserted into the bobbin; and a coil wound around the bobbin. When the smart terminal is held in the clamping member, a magnetic field change of a speaker voice coil of the smart terminal is converted into an electrical signal through electromagnetic induction of the induction module, and the processing module treats the electrical signal and transmits the treated electrical signal to the speaker unit, where the electrical signal is restored to an audio signal for output.

20 Claims, 10 Drawing Sheets

AUDIO DEVICE

TECHNICAL FIELD

The present disclosure relates to a field of acoustic signal output device, and in particular to an audio device.

BACKGROUND

Music appreciation has become an indispensable part of daily life with the diversified development of modern entertainment activities. As an electro-acoustic conversion device that transforms audio electrical signals into sound waves, loudspeakers can establish rapid wired or wireless connections with various audio source devices including but not limited to smartphones, tablet computers, laptop computers, and MP3 players, thereby achieving convenient and efficient audio amplification. Consequently, they have gained increasing favor among consumers.

Current loudspeaker products on the market still exhibit several limitations: Firstly, the product configurations mainly focus on portable loudspeakers with monotonous forms, lacking innovative design features. Secondly, existing products often emphasize only the implementation of basic playback functions with single functionality, while neglecting the emotional design aspects of user experience. These products fail to deliver psychologically pleasant effects through product design and usage experience. This status quo of functional singularity and aesthetically deficient forms clearly cannot meet contemporary consumers' growing demands for product quality and emotional experience.

SUMMARY

In view of this, the present disclosure provides an audio device aimed at solving or at least improving the above-mentioned problems to some extent.

An audio device, which includes: a base defining a first accommodation cavity; a clamping member connected with the base for holding a smart terminal; a speaker unit arranged within the first accommodation cavity; a processing module electrically connected to the speaker unit; and at least one induction module electrically connected to the processing module; wherein the at least one induction module comprises a bobbin and silicon steel laminations inserted into the bobbin, and the bobbin is wound with a coil wrapped with an insulating layer.

In some embodiments, the processing module and the at least one induction module are disposed within the first accommodation cavity, and the clamping member is configured as a holding position provided on an outer wall of the base.

In some embodiments, the coil is a low-frequency transformer coil, and the processing module is a PCB board.

In some embodiments, the at least one induction module comprises two induction modules respectively arranged at two ends of the PCB board.

In some embodiments, a battery and a controller electrically connected to the battery are provided within the first accommodation cavity, the speaker unit is electrically connected to the controller, a charging port is provided on the outer wall of the base, and sound holes are provided on the outer wall of the base, corresponding to a position of the speaker unit.

In some embodiments, an LED light electrically connected to the controller is arranged within the first accommodation cavity.

In some embodiments, a light-diffusing component that is at least partially hollowed out is further provided within the first accommodation cavity.

In some embodiments, the outer wall of the base is provided with a plurality of button holes, a plurality of operation buttons electrically connected to the controller is provided within the first accommodation cavity for power switch, LED control and volume adjustment, with button caps covering the buttons and protruding through corresponding button holes of the base.

In some embodiments, the clamping member defines a second accommodation cavity, and the processing module and the at least one induction module are disposed within the second accommodation cavity.

In some embodiments, the audio device further includes a connecting member, wherein two axial ends of the connecting member are rotatably connected to the base and the clamping member, respectively.

In some embodiments, the base is provided with a hinge seat having a pin hole, and the connecting member is rotatably connected to the hinge seat via a pin shaft engaging the pin hole.

In some embodiments, an end of the connecting member distal from the base is provided with a universal ball, and the clamping member is provided with a socket structure engaged with the universal ball, wherein the socket structure at least partially encloses the universal ball and is rotatable around the universal ball with multiple degrees of freedom.

In some embodiments, the socket structure comprises a plurality of claw segments arranged at intervals along a circumferential direction, and a locking ring is movably mounted around outer peripheries of the plurality of claw segments, and an inner wall of the locking ring is provided with ribs that respectively engage between the claw segments, wherein movement of each locking ring causes the ribs to abut against or separate from corresponding claw segment, thereby locking or releasing the universal ball.

In some embodiments, an outer periphery of the locking ring is provided with anti-slip patterns.

In some embodiments, the clamping member comprises a first clamping arm and a second clamping arm configured to respectively clamp opposite first and second sides of the smart terminal, and the second clamping arm is partially located within the second accommodation cavity and partially extends outside the second accommodation cavity, and a portion of the second clamping arm accommodated inside the second accommodation cavity is elastically pressed against an inner wall of the second accommodation cavity through an elastomer, wherein when an external force is applied to the first clamping arm, a distance between the first and second clamping arms is adjustable to clamp or release the smart terminal.

In some embodiments, a partition wall that divides the second accommodation cavity into upper and lower portions is provided within the second accommodation cavity, wherein the second clamping arm and the processing module are accommodated within the upper and lower portions of the second accommodation cavity, respectively.

In some embodiments, a bar-shaped rail is further provided within the second accommodation cavity, wherein the bar-shaped rail penetrates the clamping member to form an opening, and the second clamping arm is movable along the bar-shaped rail and extendable out the clamping member through the opening.

In some embodiments, a side of the first clamping arm toward the elastomer is provided with a positioning shaft, wherein the elastomer is mounted around the positioning shaft and abuts against the inner wall of the second accommodation cavity.

In some embodiments, the clamping member further comprises a support plate for supporting a third side of the smart terminal, and the elastomer is a strip spring.

In some embodiments, a surface of the support plate is provided with an anti-slip pad.

In some embodiments, the bobbin is configured in an I-core shape or a dual-E-core shape.

When the smart terminal is held in the clamping member, a magnetic field change of a speaker voice coil of the smart terminal is converted into an electrical signal through electromagnetic induction of the at least one induction module, and the processing module processes the electrical signal and transmits the processed electrical signal to the speaker unit, where the processed electrical signal is restored to an audio signal for output. As such, the audio device disclosed in the present disclosure achieves signal interaction with the smart terminal without relying on traditional wired or wireless connections. When the smart terminal is placed in a designated area of the device, the transformer coil of the audio equipment induces the alternating magnetic field generated by the voice coil of the smart terminal's speaker in real time through electromagnetic induction principles, converts it into an electrical signal, and then amplifies and restores it to an audio signal output through the speaker unit. This solution can solve the problems of messy connection cables in traditional audio equipment and eliminate wireless pairing operations, thereby improving user experience.

BRIEF DESCRIPTION OF DRAWINGS

In order to explain technical solutions of the present disclosure more clearly, accompanying drawings required to be used in describing the embodiments or the prior art will be briefly introduced below. Obviously, the accompanying drawings in the following description are only some embodiments of the present disclosure. For those ordinarily skilled in the art, other accompanying drawings may be obtained based on these accompanying drawings without any creative labor.

REFERENCE SIGNS

Figure 1A:
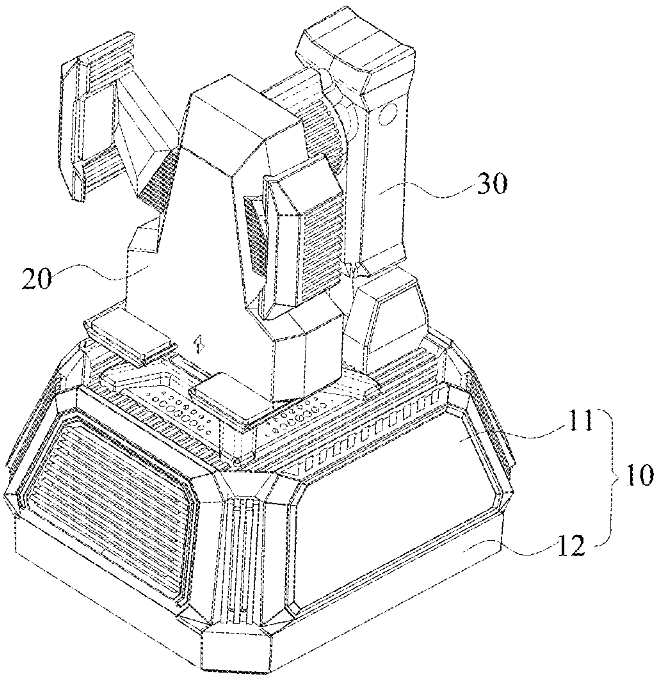
FIG. 1A is a perspective view of an audio device according to a first embodiment of the present disclosure.
Figure 1B:
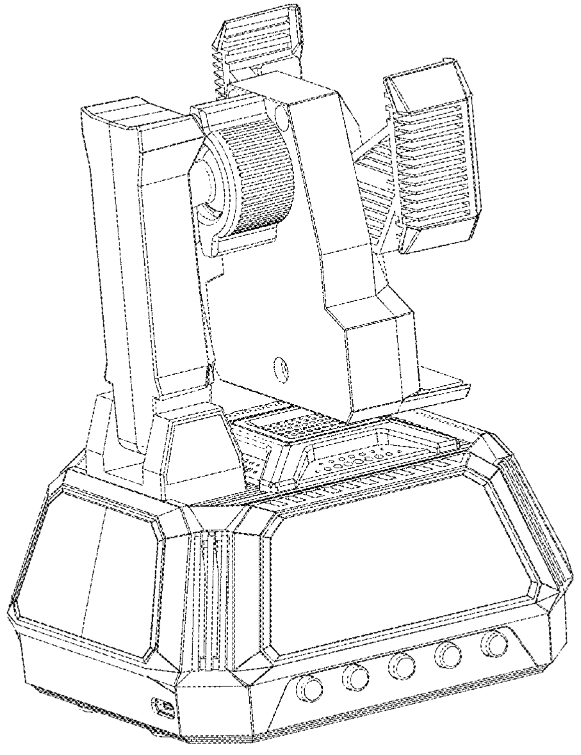
FIG. 1B is another perspective view of the audio device in FIG. 1A.
Figure 1C:
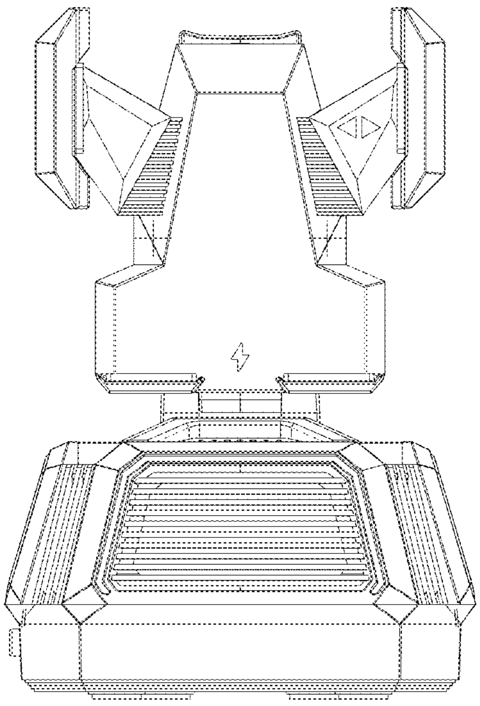
FIG. 1C is a front view of the audio device in FIG. 1A.
Figure 1D:
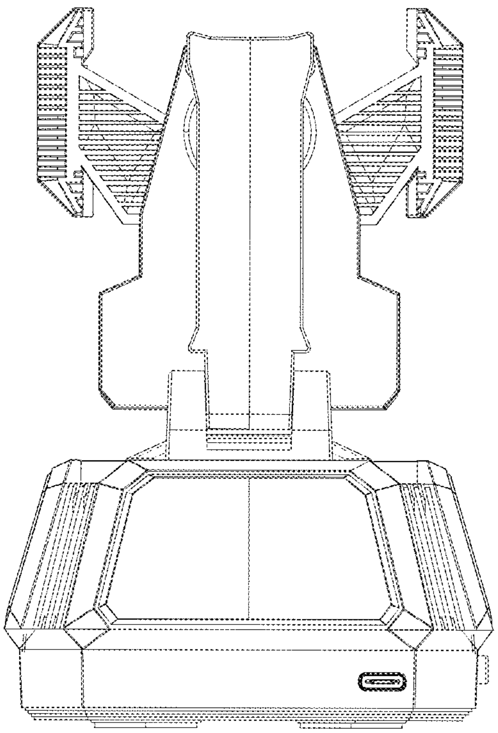
FIG. 1D is a back view of the audio device in FIG. 1A.
Figure 1E:
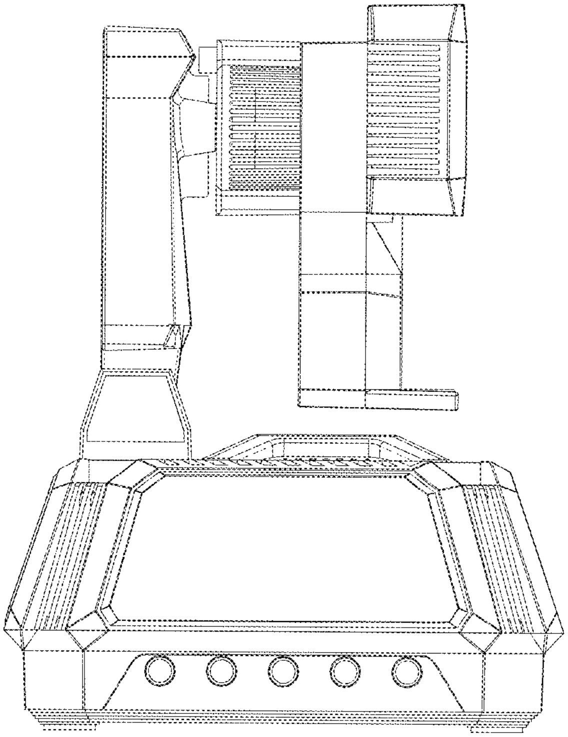
FIG. 1E is a left view of the audio device in FIG. 1A.
Figure 1F:
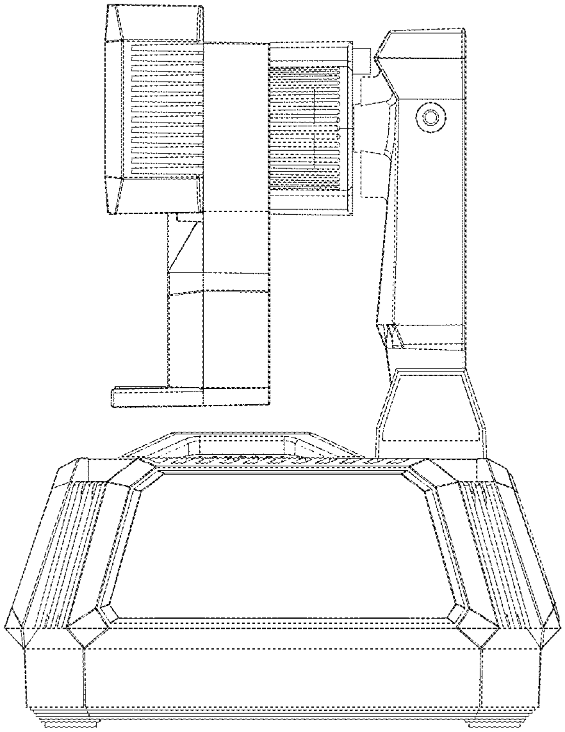
FIG. 1F is a top view of the audio device in FIG. 1A.
Figure 1G:
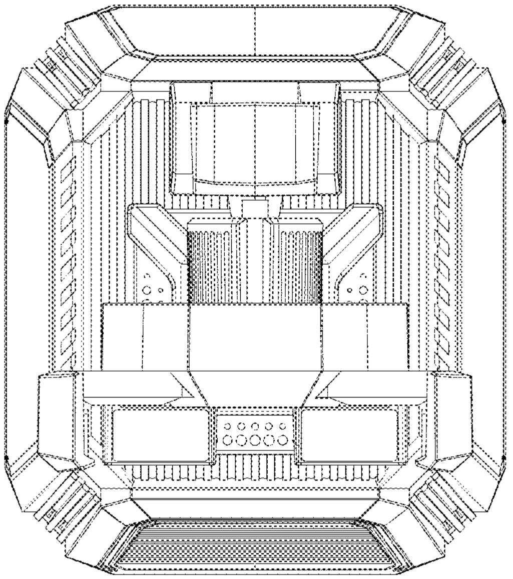
FIG. 1G is a front view of the audio device in FIG. 1A.
Figure 1H:
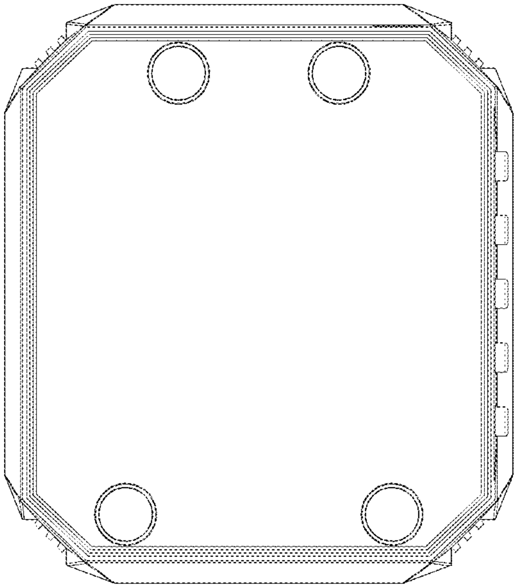
FIG. 1H is a bottom view of the audio device in FIG. 1A.

10, base; 11, upper shell; 111, first accommodation cavity; 112, hinge seat; 113, first pin hole; 114, pin shaft; 115, sound hole; 116, light-transmitting hole; 12, lower shell; 121, button hole; 122, charging port; 13, controller; 14, speaker; 15, LED light board; 16, light-diffusing component; 17, button; 18, button cap; 19, battery.

20, clamping member; 21, front shell; 22, rear shell; 23, second accommodation cavity; 211, first clamping arm; 2111, first clamping portion; 212, support plate; 213, anti-slip pad; 24, second clamping arm; 241, clamping section; 2411, second clamping portion; 242, abutting section; 243, positioning shaft; 244, connecting section; 231, first side wall; 232, second side wall; 233, rail; 234, opening; 235, first partition wall; 236, second partition wall; 25, elastomer; 26, socket structure; 261, claw segment; 27, locking ring; 271, rib; 28, processing module; 29, induction module; 291, bobbin; 292, silicon steel laminations; 293, coil. 30, connecting member; 31, second pin hole; 32, protruding portion; 321, universal ball.

DESCRIPTION OF EMBODIMENTS

The technical solutions in embodiments of the present disclosure will be clearly and completely described below with reference to accompanying drawings in the embodiments of the present disclosure. Apparently, the described embodiments are only part of the embodiments of the present disclosure, but not all of the embodiments. Based on the embodiments in the present disclosure, all other embodiments obtained by those skilled in the art without creative labor shall fall within the protection scope of the present disclosure.

It should be noted that all directional indications (such as up, down, left, right, front, back, etc.) in the embodiments of the present disclosure are only intended to explain a relative positional relationship, a motion situation, and the like between components in a particular pose (as shown in the figures), and if the particular pose changes, the directional indication changes accordingly.

In addition, if terms “first”, “second” or the like are involved in the embodiments of the present disclosure, the terms are for illustrative purposes only and are not to be construed as indicating or imposing a relative importance or implicitly indicating the number of technical features indicated. Thus, a feature that limited by “first”, “second” may expressly or implicitly include at least one of the features. In addition, the technical solutions of the various embodiments may be combined with each other, but the combination of the technical solutions must be realized by a person of ordinary skill in the art. When the combination of the technical solutions is inconsistent with each other or cannot be realized, the combination of the technical solutions should be considered not to exist or fall within the protection scope of the present disclosure.

As shown in FIGS. 1A to 1H, and 2-4, an audio device according to the first embodiment of the present disclosure is illustrated. The audio device includes a base 10, a clamping member 20 connected to the base 10 for holding a smart terminal, a speaker unit 14 located within the base 10, and a processing module 28 electrically connected to the speaker unit 14. The processing module 28 is provided with one or more induction module 29. The base 10 defines a first accommodation cavity 111, and the speaker unit 14 is mounted within the first accommodation cavity 111. The smart terminal may include, but is not limited to, common electronic devices such as mobile phones and tablet computers. When the smart terminal is placed on the clamping member 20, a magnetic field change of a speaker voice coil of the smart terminal is converted into an electrical signal through electromagnetic induction of the at least one induction module 29, which is transmitted to the processing module. The processing module 28 processes the electrical signal and transmits the processed electrical signal to the speaker unit 14, where the processed signal is restored to an audio signal for output.

The audio device disclosed utilizes near-field magnetic coupling to amplify sound from the smart terminal, enabling contactless signal transmission. This eliminates cable clutter associated with traditional wired connections while requiring no wireless pairing operations, thereby significantly enhancing user experience.

Figure 4:
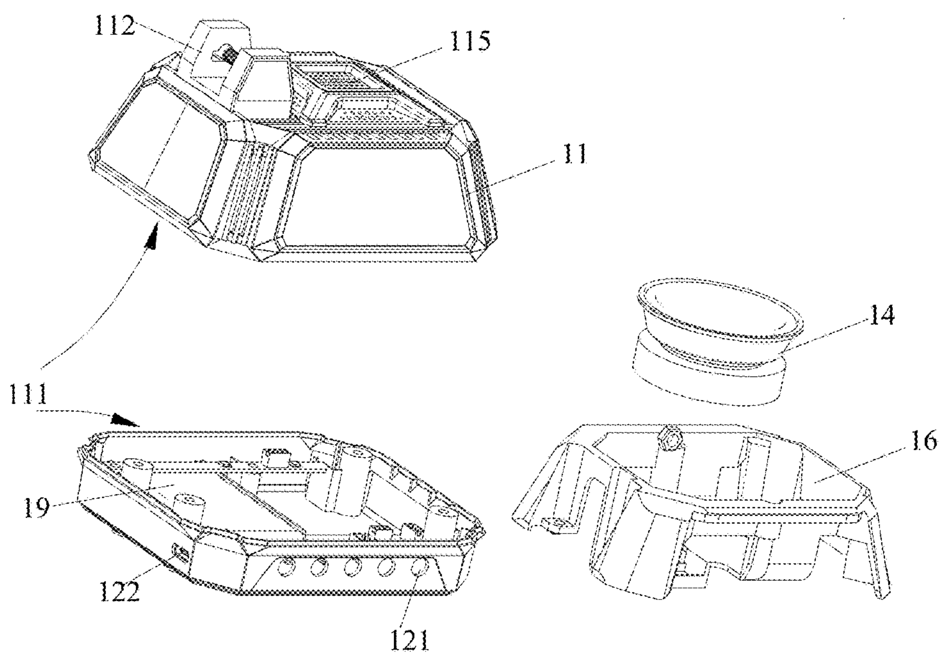
FIG. 4 is an exploded view of the base of the audio device in FIG. 1A, with some components omitted.

Please refer to the FIG. 4, the base 10 includes an upper shell 11 and a lower shell 12, which together define the first accommodation cavity 111. The upper shell 11 is generally shaped like a truncated pyramid with a narrower top and a wider bottom. The first accommodation cavity 111 houses the speaker unit 14, which converts the processed electrical signals from the processing module 28 into sound signals for output. Preferably, the sound-emitting surface of the speaker unit 14 faces the upper shell 11, and the top surface of the upper shell 11 is provided with sound-emitting holes 115 corresponding to the speaker unit 14. A battery 19 that supplies power to the system and a controller 13 that controls the operation of the system are further provided within the first accommodation cavity 111. Optionally, the controller is a main board. Further optionally, the side wall of the lower shell 12 is provided with a charging port 122 for easy charging.

In this embodiment, an LED light 15 electrically connected to the controller 13 is further provided within the first accommodation cavity 111. Side walls of the truncated pyramid shaped upper shell 11 are connected by a chamfered surface, which may be provided with light-transmitting holes 116 corresponding to the LED light 15. Further preferably, a light-diffusing component 16 is provided within the first accommodation cavity 111. The light-diffusing component 16 is at least partially hollowed out to emit specific lighting effects. Specifically, the light-diffusing component 16 in this embodiment is also generally shaped like a truncated pyramid with a narrower top and a wider bottom, including a square top side and four inclined sides. Its sides may be hollowed out, forming an open framework. Thus, battery 19, speaker unit 14, LED light 15, and controller 13 may all be accommodated within the space defined by the light-diffusing component 16. Preferably, opposite sides of the square top frame of the light-diffusing component 16 extend downward and are integrally formed into brackets 161 and 162 to hold the speaker unit 14 and battery 19 respectively, ensuring precise positioning and stable support.

In this embodiment, the outer wall of the lower shell 12 is provided with a plurality of button holes 121. Accordingly, a plurality of operation buttons 17 electrically connected to the controller 13 are provided within the first accommodation cavity 111 for power switch, LED control and volume adjustment, with button caps 18 covering the buttons 17 and protruding through corresponding button holes 121 of the lower shell 12.

Figure 2:
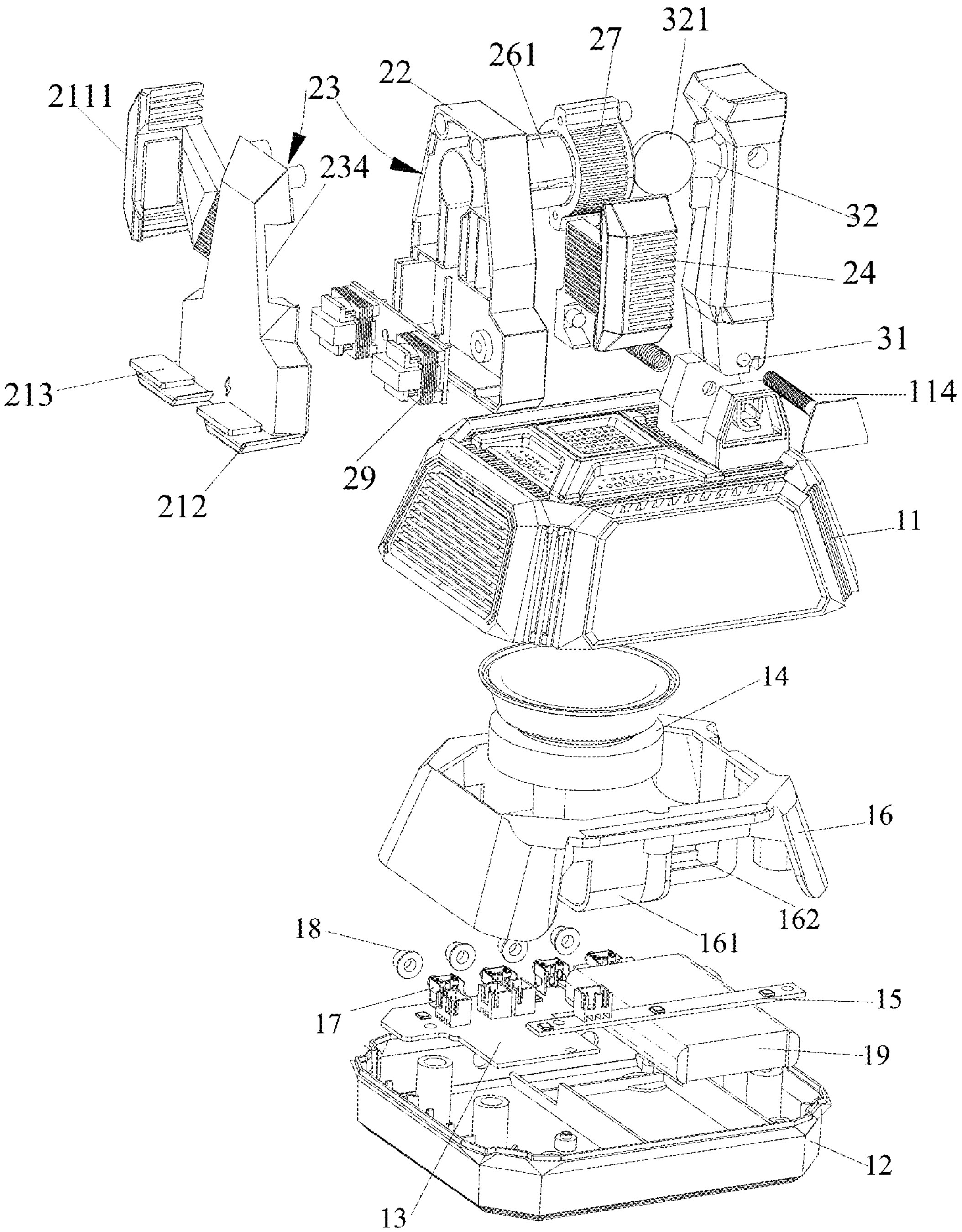
FIG. 2 is an exploded view of the audio device in FIG. 1A.
Figure 3:
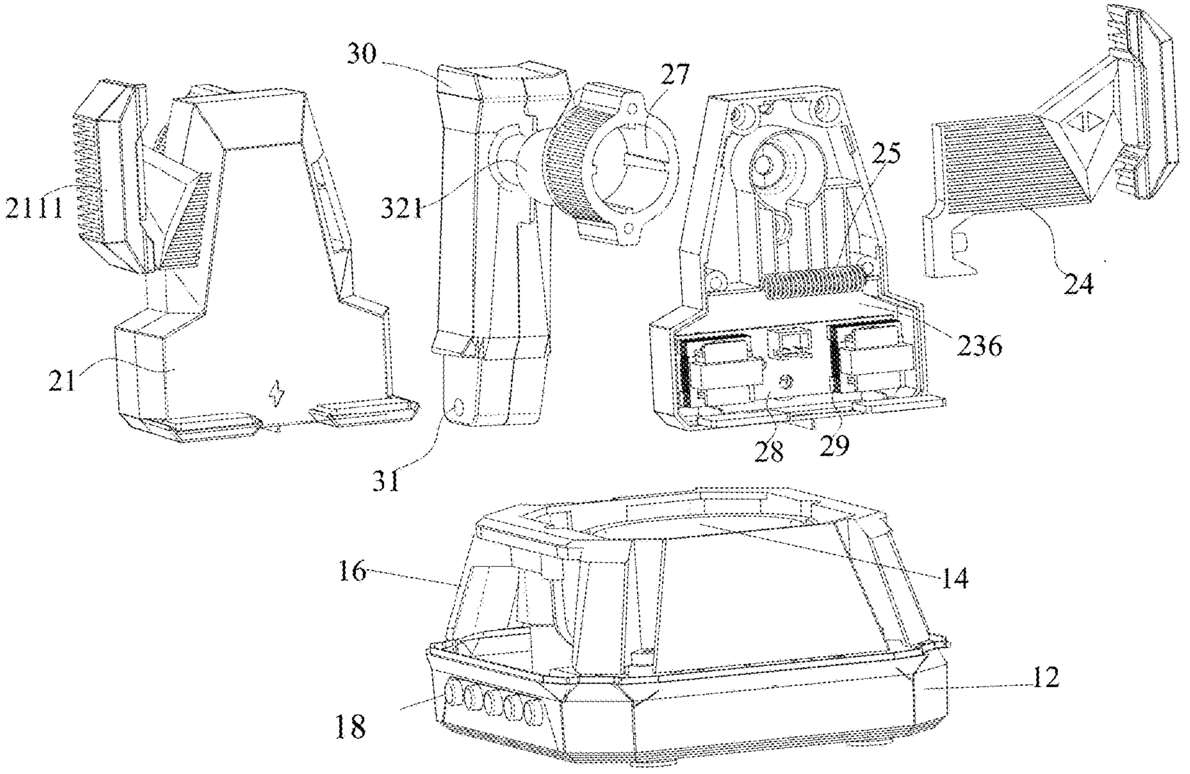
FIG. 3 is another exploded view of the audio device in FIG. 1A with some components omitted

Specifically, as shown in FIGS. 2 to 3, the clamping member 20 is connected to the base 10. The clamping member 20 includes a snap-fit front shell 21 and a rear shell 22 that together define a second containment cavity 23. The processing module 28 and the induction module 29 are disposed within the second accommodation cavity 23.

Figure 7:
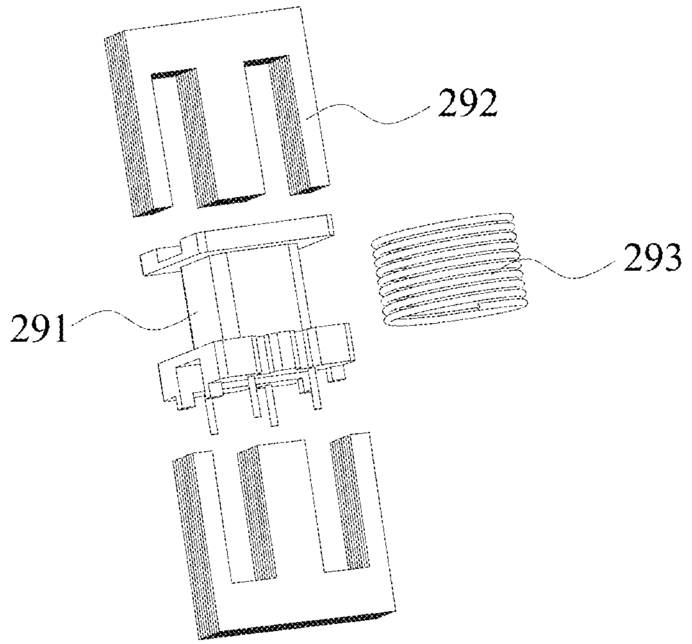
FIG. 7 is an exploded view of an induction module of the audio device in FIG. 1A.
Figure 8:
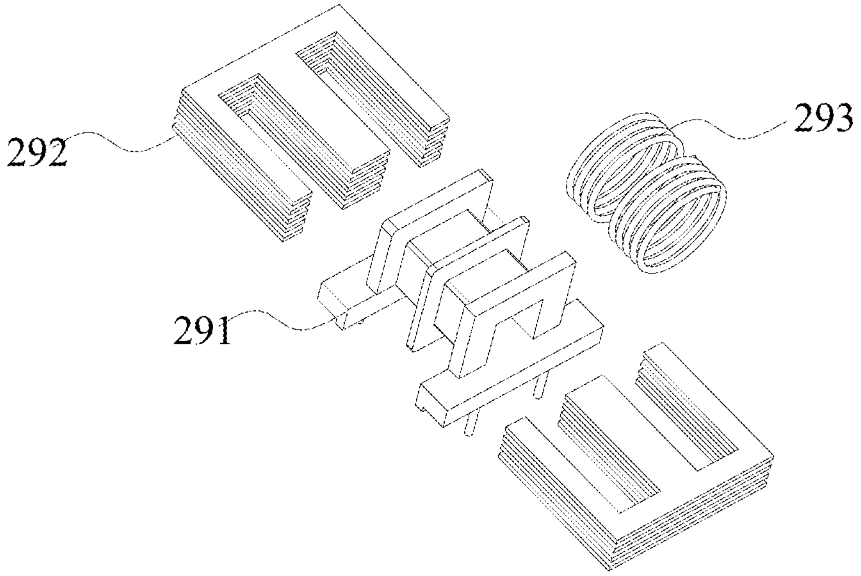
FIG. 8. is an exploded view of another induction module of the audio device in FIG. 1

The induction module 29 is configured to induce the magnetic field changes of the speaker voice coil of the smart terminal and convert them into electrical signals. In this implementation, the at least one induction module includes two induction modules 29 respectively arranged at two ends of the processing module 28 to optimize the signal pickup range. As shown in FIGS. 7 to 8, the induction module 29 includes a bobbin 291, silicon steel laminations 292 inserted into the bobbin 291, and a coil 293 wound around the bobbin 291 and having an insulating layer. Optionally, the bobbin 291 is configured in an I-core shape which includes a central post and bilateral baffles. The silicon steel laminations 292 are inserted into the post, with the coil wound around the post. Alternatively, the bobbin 291 is configured in a dual-E-core shape, which includes a central post, and three spaced baffles. The simple structure of the induction module 29 enables better detection of magnetic field change in speaker voice coil of the smart terminal. Preferably, the coil 293 is a low-frequency transformer coil to improve magnetic coupling efficiency.

The processing module 28 processes these electrical signals and transmits them to the speaker unit 14, where they are ultimately converted into sound signals for output. For example, the processing module 28 may be a PCB board that amplifies, filters, or performs impedance matching on the electrical signals output by the induction module 29. Preferably, the PCB board is connected to the controller 13 via shielded flexible cables to reduce signal transmission loss.

Figure 9:
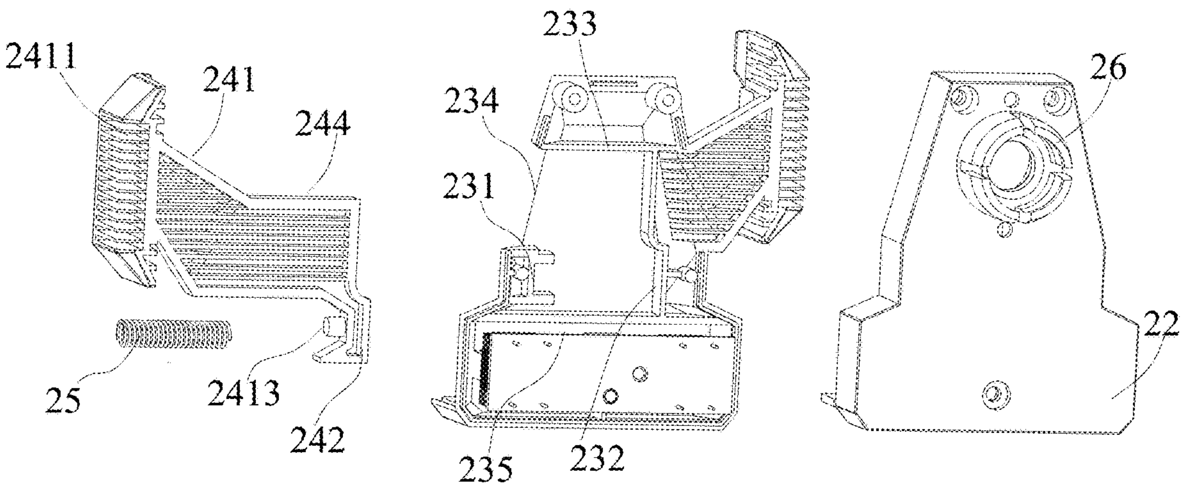
FIG. 9 is an exploded view of the clamping member of the audio device in FIG. 1A.

In some embodiments, as illustrated in FIG. 9, the clamping member 20 further includes a first clamping arm 211 and a second clamping arm 24 for clamping the smart terminal. The second clamping arm 24 is partially located within the second accommodation cavity 23 and partially extends outside the second accommodation cavity 23. The portion of the second clamping arm 24 received within the second accommodation cavity 23 is elastically abutted against the inner wall of the second accommodation cavity 23 via an elastomer 25, allowing it to move within the second accommodation cavity 23. When an external force is applied to the second clamping arm 24, the distance between the first clamping arm 211 and the second clamping arm 24 is adjustable to accommodate smart terminals of different sizes for clamping or release.

Specifically, the first clamping arm 211 is located at the upper left side of the front shell 21 and extends along the upper left side. The first clamping arm 211 is further provided with a first clamping portion 2111 for abutting against the side of the smart terminal, wherein the clamping portion 2111 is arranged perpendicular to extending direction of the first clamping arm 211. The second clamping arm 24 includes three functional sections, namely the abutting section 242, the connecting section 244, and the clamping section 241, which are sequentially connected from left to right. Specifically, the abutting section 242 extends vertically upward, the connecting section 244 extends horizontally, and the clamping section 241 extends along the upper right side. The abutting section 242 of the second clamping arm 24 is further provided with a second clamping section 2411 perpendicular to its extending direction. The second clamping section 2411 and the first clamping section 2111 are arranged opposite each other and are configured to abut against the two opposite sides of the lengthwise direction of the smart terminal.

The front shell 21 is generally shaped like a block with a narrower top and a wider bottom. The front shell 21 is provided with a horizontally extending first partition wall 235, which protrudes toward the rear shell 22 and divides the accommodation cavity defined by the front shell 21 into upper and lower parts. The lower part is configured to accommodate the connecting section 244 and the abutting section 242 of the second clamping arm 24. A horizontally extending strip guide rail 233 is provided above the first partition wall 235 to guide the movement of the second clamping arm 24. An opening 234 is provided on the right side of the front shell 21, located between the rail 233 and the second partition wall 236, to allow the clamping section 241 of the second clamping arm 24 to extend outward. A first side wall 231 which extends approximately vertically is provided between the opening 234 and the second partition wall 236, to prevent the second clamping arm 24 from disengaging from the front shell 21 through the opening 234. The front shell 21 is further provided with a second side wall 232 opposite the first side wall 231 for abutting against the abutting section 242 of the second clamping arm 24. When the second clamping arm 24 is received within the second accommodation cavity 23, the upper and lower sides of the connecting section 244 are respectively limited by the bar guide rail 233 and the top of the first side wall 231, allowing it to move horizontally back and forth along the bar guide rail 233.

A positioning shaft 243 is projected from the side of the abutting portion 242 facing the second wall 233. The elastomer 25 is sleeved on the positioning shaft 243 and abuts against the second side wall 232. When an external force is applied to the clamping portion 2411 of the second clamping arm 24 to move it away from the first clamping arm 211, the connecting section 244 moves along the bar guide rail 233, driving the abutting section 242 to move and compressing the elastomer 25. At this time, the smart terminal can be placed between the first clamping portion 2111 and the second clamping portion 2411. Subsequently, when the external force is removed, the elastomer 25 rebounds and pushes the abutting section 242 of the second clamping member 241 to reset, thereby causing the second clamping portion 2411 to tightly clamp the smart terminal. Preferably, the elastomer 25 is a bar spring.

Preferably, the clamping member 20 further includes a support plate 212 protruding from the front shell 21 for holding the third side of the smart terminal. The support plate 212 of this embodiment is configured to hold the bottom side of the smart terminal. More preferably, the surface of the support plate 212 is provided with an anti-slip pad 213.

The rear shell 22 is further provided with a second partition wall 236 corresponding to the first partition wall 235, which extends horizontally and protrudes toward the front shell 21. The second partition wall 236, together with the first partition 235, divides the accommodation cavity defined by the rear shell 22 into upper and lower parts. The lower part of the accommodation cavity is configured to place the processing module 28. The processing module 28 is in a strip shape and faces the front shell 21, with two induction modules 29 facing the front shell 21, to facilitate sensing the magnetic field changes of the speaker voice coil of the smart terminal.

Further preferably, as illustrated in FIGS. 2 to 3 and 5 to 6, the audio device of this embodiment further includes a connecting member 30 movably connected to the base 10, so as to enable multi-angle adjustment of the placement position of the smart terminal. Specifically, the connecting member 30 is in a strip shape and has two opposite ends along its axis, respectively configured for rotatable connection with the base 10 and the clamping member 20.

Figure 5:
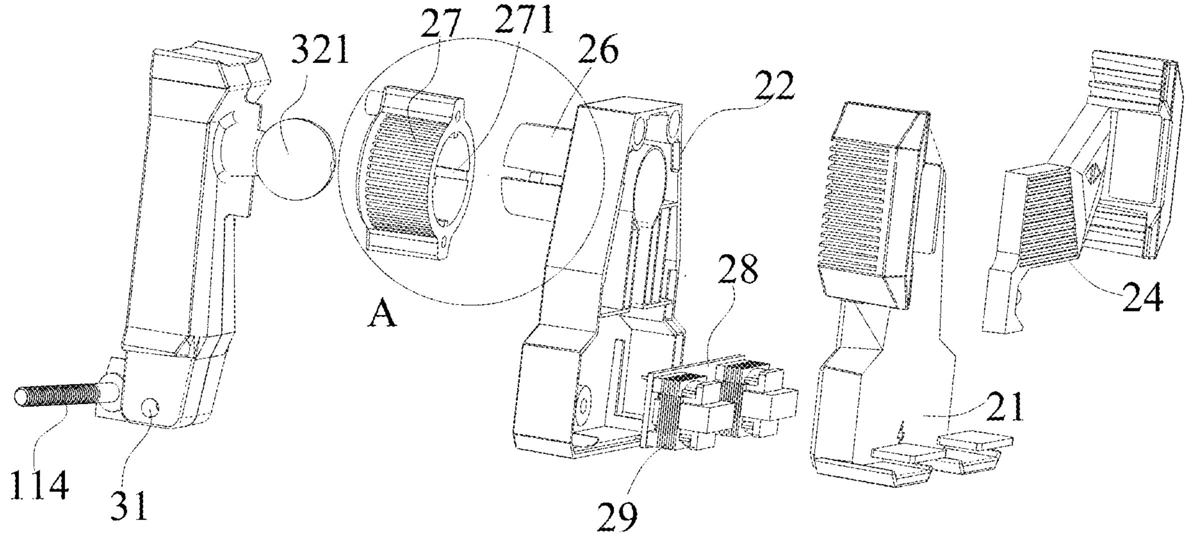
FIG. 5 is an exploded view of a clamping member and a connecting member of the audio device in FIG. 1A.
Figure 6:
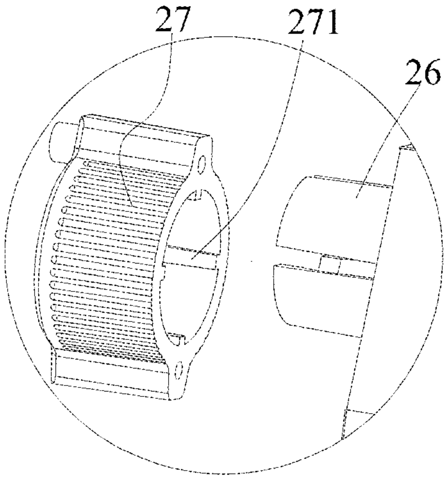
FIG. 6 shows an enlarged view of section A in FIG. 5.

Please refer to FIGS. 2 and 5, the upper end of the base 10 is equipped with a hinge base 112 and a pin shaft 114. The hinge base 112 is provided with a first pin hole 113, and the end of the connecting member 30 away from the clamping member 20 is provided with a second pin hole 31 corresponding to the first pin hole 113. The pin shaft 114 passes through the first pin hole 113 and the second pin hole 31, thereby allowing a rotatable connection between the connecting member 30 and the hinge seat 112. Preferably, a damping piece may further be provided on the pin shaft 114 to provide rotational resistance.

The end of the connecting member 30 away from the base 10 is provided with a protruding portion 32 perpendicular to the extending direction of the connecting member 30. A universal ball 321 is formed at the end of the protruding portion 32. The rear shell 22 of the clamping member 20 is provided with a socket structure 26 engaged with the universal ball 321. The socket structure 26 at least partially encloses the universal ball 321 and is rotatable around the universal ball 321 with multiple degrees of freedom.

The socket structure 26 includes a plurality of claw segments 261 arranged at intervals along the circumferential direction. The inner walls of the claw segments 261 are recessed to fit the outer periphery of the universal ball 321, thereby enclosing the universal ball 321. Preferably, the gaps between adjacent claw segments 261 gradually increase in the direction from the rear shell 22 toward the connecting member 30. A locking ring 27 is mounted around the outer periphery of the claw segments 261. The locking ring 27 is cylindrical, with ribs 271 provided on its inner wall, which are respectively engaged with the gaps between the claw segments. By moving the locking ring 27 along the extension direction of the protruding portion 32, the ribs 271 are allowed to abut against or move away from the corresponding claw segments 261, thereby causing the claw segments to lock or release the universal ball 321. Further preferably, the outer surface of the locking ring 27 is provided with anti-slip patterns to facilitate the movement of the locking ring 27.

In this embodiment, when the locking ring 27 is moved along the direction of the connecting member 30, the ribs 271 move away from the claw segments 261. At this time, the claw segments 261 release the universal ball 321, allowing the clamping member 20 and the smart terminal to be rotated to a suitable angle. Subsequently, when the locking ring 27 is moved in the direction toward the rear shell 22, the ribs 271 move together to tightly abut against adjacent claw segments 261. At this point, the universal ball 321 is locked in place by the claw segments, thereby fixing the clamping member 20 relative to the connecting member 30.

Figure 10:
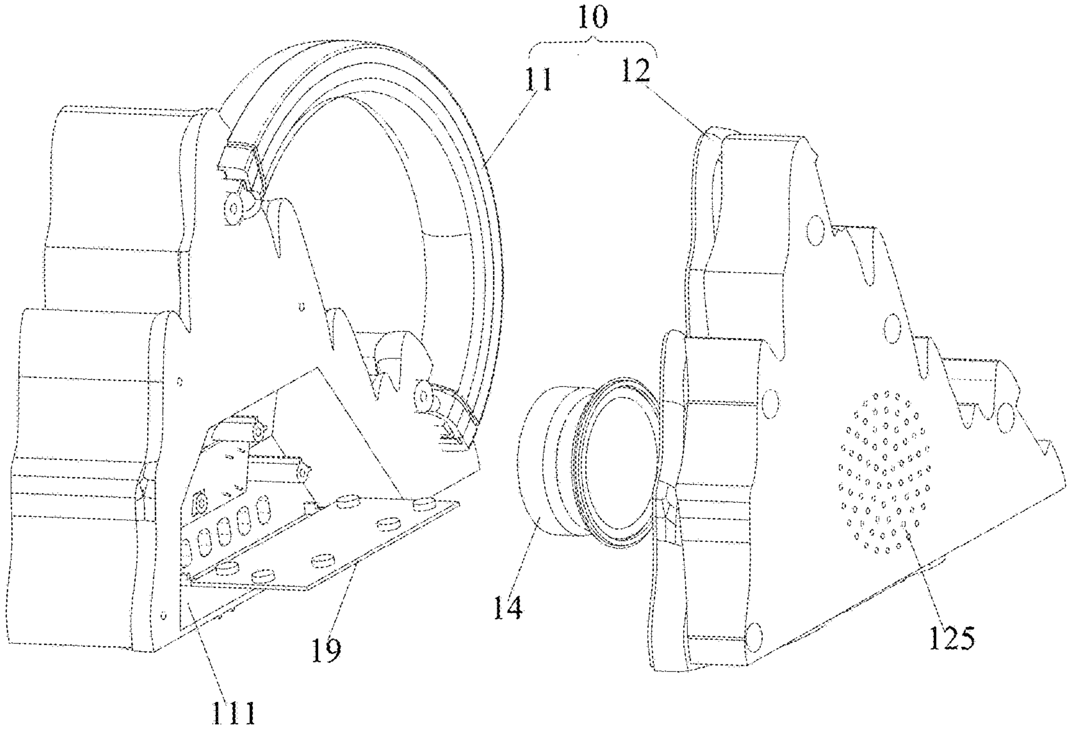
FIG. 10 is an exploded view of an audio device according to a second embodiment of the present disclosure.
Figure 11:
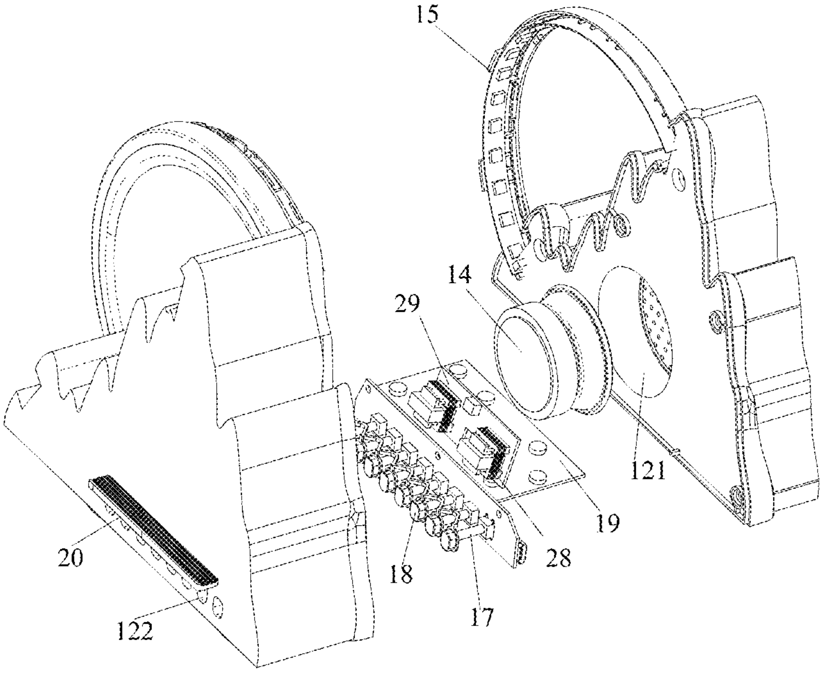
FIG. 11 is another exploded view of the audio device in FIG. 10.

As shown in FIGS. 10 to 11, an audio device according to the second embodiment of the present disclosure is illustrated. The audio device is constructed in the shape of a fake mountain and includes a base 10 defining a first accommodation cavity. The base 10 is provided with a clamping member 20 for securing a smart terminal. A processing module 28 and a speaker unit 14 electrically connected to the processing module are mounted within the first accommodation cavity 111. At least one induction module 29 configured to induce the magnetic field changes of the speaker voice coil of the smart terminal and convert them into electrical signals is deposed on the processing module. The processing module 28 processes these electrical signals and transmits them to the speaker unit 14, where they are ultimately converted into sound signals for output.

Specifically, the base 10 includes a front shell 11 defining a front accommodation cavity 111 and a rear shell 12 defining a rear accommodation cavity 121, wherein the front accommodation cavity 111 and the rear accommodation cavity 121 constitute the first accommodation cavity. The clamping member 20 is configured as a holding position provided on the front shell 21. The at least one induction module 29 is disposed within the front accommodation cavity 111 of the front shell 11 at a position corresponding to the holding position, so that when the smart terminal is held at the holding position, the induction module 29 effectively induces the magnetic field changes of the speaker voice coil of the smart terminal. The at least one induction module includes two induction modules 29 respectively arranged at two ends of the processing module 28 to optimize the signal pickup range. As in the first embodiment, the induction module 29 is a low-frequency transformer coil to ensure efficient coupling with the magnetic field changes of the smart terminal. Preferably, the processing module 28, along with the induction module, faces the front shell 21, allowing the induction module 29 to better align closely with the speaker voice coil of the smart terminal. In this embodiment, the speaker unit 14 is mounted within the rear accommodation cavity 121, with the sound-emitting surface of the speaker unit 14 facing the rear shell 22, and the rear side of the rear shell 12 is provided with a sound-emitting hole 125 corresponding to the position of the speaker unit 14.

Preferably, a battery 19 that supplies power to the system and a controller 13 that controls the operation of the system are further provided within the front accommodation cavity 111.

In one implementation, a handle is connected between the mountain top and the mountain bottom of the base 10. Further preferably, the handle is designed in an arc shape, resembling a crescent moon, complementing the false mountain-shaped base 10 and enhancing the overall aesthetic design of the audio device. An LED light 15 electrically connected to the controller 13 is further provided within the handle. More preferably, the handle is made of a light-diffusing material, cooperating with the LED light 15 in the first accommodation cavity 111 to achieve ambient lighting.

In this embodiment, the outer wall of the base 10 is provided with a plurality of button holes 122. Accordingly, a plurality of operation buttons 17 electrically connected to the controller 13 are provided within the first accommodation cavity 111 for power switch, LED control and volume adjustment, with button caps 18 covering the buttons 17 and protruding through corresponding button holes 121 of the base 10.

The above is merely preferred embodiments of the present disclosure and is not intended to limit the scope of the present disclosure. The equivalent structures or equivalent processes made based on the disclosure concept of the present disclosure by the description and drawings of the present disclosure or the description and drawings of the present disclosure utilized directly or indirectly in other related fields of technology should be similarly included within the scope of the present disclosure.

What is claimed is:

1. An audio device, comprising:

a base defining a first accommodation cavity;

a clamping member connected to the base for holding a smart terminal;

a speaker unit arranged within the first accommodation cavity;

a processing module electrically connected to the speaker unit; and at least one induction module electrically connected to the processing module;

wherein the at least one induction module comprises:

a bobbin;

silicon steel laminations inserted into the bobbin; and a coil wound around the bobbin.

2. The audio device of claim 1, wherein the processing module and the at least one induction module are disposed within the first accommodation cavity, and the clamping member is configured as a holding position provided on an outer wall of the base.

3. The audio device of claim 1, wherein the coil is a low-frequency transformer coil, and the processing module is a PCB.

4. The audio device of claim 3, wherein the at least one induction module comprises two induction modules respectively arranged at two ends of the PCB.

5. The audio device of claim 1, wherein a battery and a controller electrically connected to the battery are provided within the first accommodation cavity, the speaker unit is electrically connected to the controller, a charging port is provided on the outer wall of the base, and sound holes are provided on the outer wall of the base, corresponding to a position of the speaker unit.

6. The audio device of claim 5, wherein an LED light electrically connected to the controller is arranged within the first accommodation cavity.

7. The audio device of claim 6, wherein a light-diffusing component that is at least partially hollowed out is further provided within the first accommodation cavity.

8. The audio device of claim 7, wherein the outer wall of the base is provided with a plurality of button holes, a plurality of operation buttons electrically connected to the controller is provided within the first accommodation cavity for power switch, LED control and volume adjustment, with button caps covering the buttons and protruding through corresponding button holes of the base.

9. The audio device of claim 1, wherein the clamping member defines a second accommodation cavity, and the processing module and the at least one induction module are disposed within the second accommodation cavity.

10. The audio device of claim 9, further comprising a connecting member with two axial ends rotatably connected to the base and the clamping member, respectively.

11. The audio device of claim 10, wherein the base is provided with a hinge seat having a pin hole, and the connecting member is rotatably connected to the hinge seat via a pin shaft engaging the pin hole.

12. The audio device of claim 10, wherein an end of the connecting member distal from the base is provided with a universal ball, and the clamping member is provided with a socket structure engaged with the universal ball, wherein the socket structure at least partially encloses the universal ball and is rotatable around the universal ball with multiple degrees of freedom.

13. The audio device of claim 12, wherein the socket structure comprises a plurality of claw segments arranged at intervals along a circumferential direction, a locking ring is movably mounted around outer peripheries of the plurality of claw segments, and an inner wall of the locking ring is provided with ribs that respectively engage between the claw segments, wherein movement of each locking ring causes the ribs to abut against or separate from corresponding claw segment, thereby locking or releasing the universal ball.

14. The audio device of claim 13, wherein an outer periphery of the locking ring is provided with anti-slip patterns.

15. The audio device of claim 8, wherein the clamping member comprises a first clamping arm and a second clamping arm configured to clamp opposite first and second sides of the smart terminal, respectively, and the second clamping arm is partially received within the second accommodation cavity, with a portion extending outside therefrom, and a portion of the second clamping arm accommodated inside the second accommodation cavity is elastically pressed against an inner wall of the second accommodation cavity through an elastomer, wherein when an external force is applied to the first clamping arm, a distance between the first and second clamping arms is adjustable to clamp or release the smart terminal.

16. The audio device of claim 15, wherein a partition wall is provided within the second accommodation cavity that divides the second accommodation cavity into upper and lower portions, wherein the second clamping arm and the processing module are accommodated within the upper and lower portions of the second accommodation cavity, respectively.

17. The audio device of claim 16, wherein a bar-shaped rail configured to guide movement of the second clamping arm is provided within the second accommodation cavity, the clamping member is further provided with an opening located below the rail, and the second clamping arm is movable along the rail and extendable out the clamping member through the opening.

18. The audio device of claim 15, wherein a side of the first clamping arm toward the elastomer is provided with a positioning shaft, the elastomer is mounted around the positioning shaft and abuts against the inner wall of the second accommodation cavity, and the elastomer is a strip spring.

19. The audio device of claim 15, wherein the clamping member further comprises a support plate for supporting a third side of the smart terminal, and a surface of the support plate is provided with an anti-slip pad.

20. The audio device of claim 1, wherein the bobbin is configured in an I-core shape or a dual-E-core shape.

* * * * *